Nov. 26, 1963 S. B. WEINBERG 3,112,373

PRIVATE BRANCH TELEPHONE SYSTEM WITH CAMP ON FACILITIES

Filed May 8, 1961 3 Sheets-Sheet 1

INVENTOR
S. B. WEINBERG
BY J. R. McCorkindale
ATTORNEY

PRIVATE BRANCH TELEPHONE SYSTEM WITH CAMP ON FACILITIES

Filed May 8, 1961 3 Sheets-Sheet 2

INVENTOR
S. B. WEINBERG
BY J. A. McCorkendale
ATTORNEY

INVENTOR
S. B. WEINBERG
BY J. A. McCorkendale
ATTORNEY

United States Patent Office 3,112,373
Patented Nov. 26, 1963

3,112,373

PRIVATE BRANCH TELEPHONE SYSTEM WITH CAMP ON FACILITIES

Seymour B. Weinberg, Massapequa, N.Y., assignor to Bell Telephone Laboratories, Incorporated, New York, N.Y., a corporation of New York Filed May 8, 1961, Ser. No. 108,607
10 Claims. (Cl. 179—18)

This invention relates to a telephone system and more particularly to an automatic telephone system which includes a private branch exchange.

The inclusion of the so-called "camp on" feature in telephone systems has been previously proposed and disclosed in the art; the camp on arrangement provides, in general, that when a connection is attempted to a called line and the called line is found to be busy, the partially completed connection is "held" until the called line becomes free, whereupon the connection is completed and the called party signaled. Provision of the camp on feature is particularly desirable in connection with private branch exchange operations in order that one extension user, for example an executive of the firm, may be able to complete a call to an associate without undue delay and without repetitious dialing, even though the associate's extension may be busy when the call is first attempted. It is, of course, desirable that the calling party, particularly if on an executive level, be relieved of the task of actually "holding" or "staying on" the call and, further, if, after establishing the camp on, the calling party should leave his desk for an extended period, it is desirable that his line be automatically restored to normal condition in due course.

It is an object of my invention to improve the arrangement and operation of camp on circuits.

A more specific object of my invention is to improve the operation and enhance the desirability of camp on circuits as applied to calls from a user on an executive level to an associate worker of the firm.

In accordance with a specific embodiment of the invention, as applied particularly to use in a private branch exchange, a calling party, for example an executive of the firm, may call another extension of the private branch exchange in the usual manner. However, if the called extension is busy at the moment, the caller may hang up and then reinitiate the call by first dialing a special directing code, for example "7." This brings him to the corresponding level of a special selector-connector which is arranged to connect him through the camp on and ringback circuit proper. The called number is then dialed and camp on established. The calling party may now go on-hook if he so elects, and, when the called party also goes on-hook upon termination of the first call, both called and calling stations will be rung. In the event the calling party, after having established camp on and gone on-hook, again goes off-hook to initiate a different call the camp on connection is automatically removed.

A feature of the invention is a tone signal applied briefly both to the calling line and to the called line at the time the camp on is established; this informs the called party that an important call, for example from an executive of the firm, is awaiting his response.

A further feature of the invention is a ringback signal effective to ring both calling and called extensions as soon as the "camped-on" extension goes on-hook, and which is automatically discontinued and the circuit restored to normal if the calling party fails to acknowledge the ringback signal within a predetermined time; this assures that the lines will not be tied up indefinitely in those instances where the calling party has, in effect, abandoned the call.

A still further feature of the invention is found in means for adjusting the duration of the ringback period before the circuit is restored to normal in the absence of a response by the calling party.

Yet another feature of the invention is the automatic cancellation of the camp on connection and restoration of the circuit to normal in the event the calling party, after having established camp on and gone on-hook, again goes off-hook before ringback for initiation of another call.

A full understanding of the arrangement contemplated by the present invention as well as an appreciation of the various advantageous features thereof may be gained from consideration of the following detailed description in connection with the accompanying drawing, in which:

FIGS. 2 and 3 should be jointed left-to-right when being considered.

Figure 1:
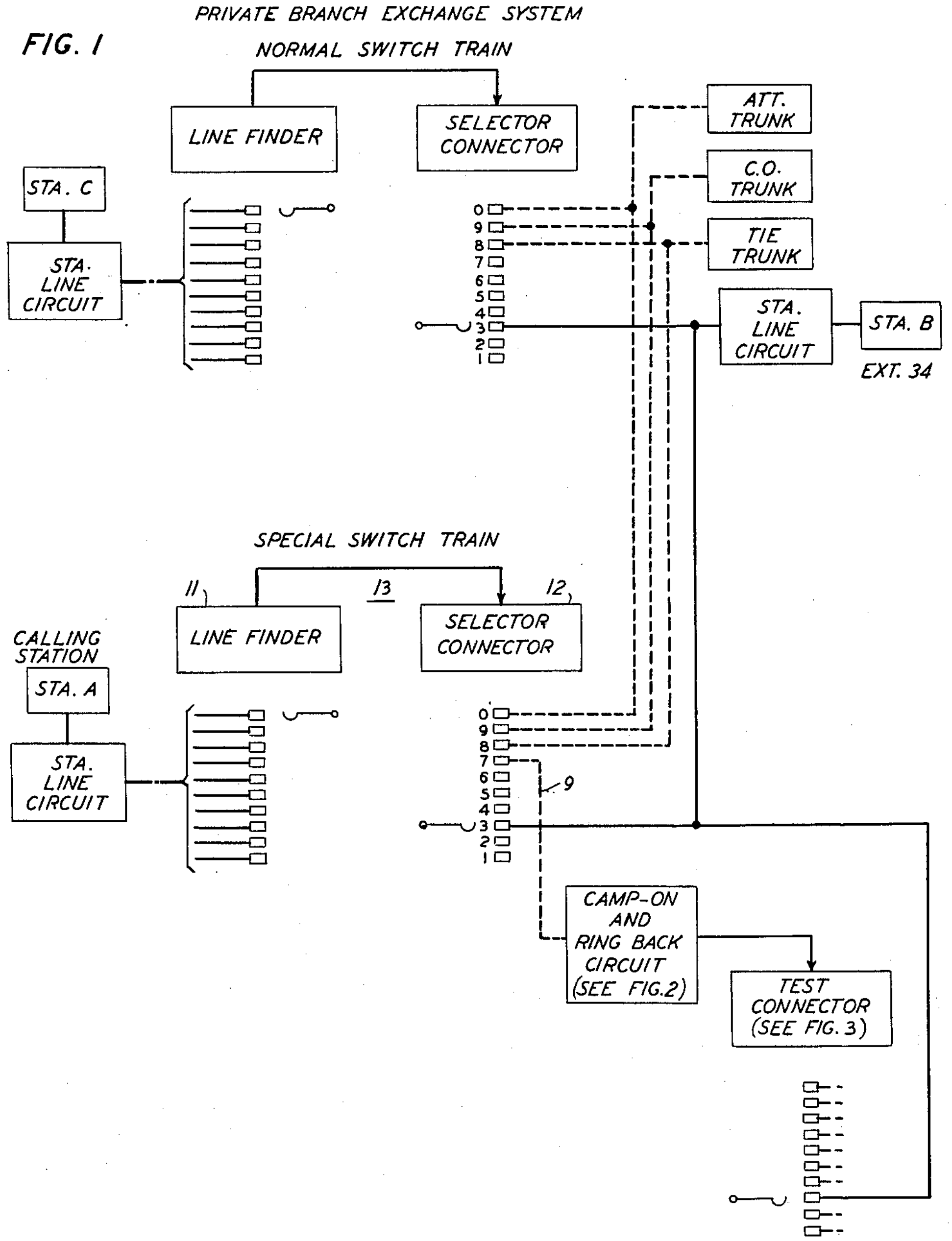
FIG. 1 shows schematically the manner in which the camp on and ringback circuit contemplated by the present invention may be associated with portions of a 2-digit step-by-step private branch exchange system.

Referring now to the drawings, and first to FIG. 1, portions of a 2-digit step-by-step private branch exchange system are schematically illustrated including a normal switch train (line finder and selector-connector) and a special switch train 13 (special line finder group and special selector-connector). Three of the PBX extensions with associated station line circuits are also shown, and for present purposes of description it will be assumed that station A, an executive's extension associated with the special line finder group, is the calling station and that station B (Ext. 34) is the called station. As shown certain terminals of the selector-connectors are strapped, and as customary, certain levels are specially connected, for example "0" level to the attendant's position, "9" level to central office trunks and "8" level to a tie trunk. "7" level of the special selector-connector alone is connected by tip, ring, and sleeve leads 9 to the camp on and ringback circuit (FIG. 2) which in turn is connected to the test connector (FIG. 3). It will be understood that the camp on circuit is available only through the special switch train to the extensions associated therewith and not to the extensions associated only with the normal switch train. It will be understood further that the camp on circuit may be associated with 3-digit or 4-digit systems in a generally similar manner, the respective switch trains being enlarged by the inclusion of additional selection units in the normal manner.

Assuming now that extension user A wishes to call station B (Ext. 34), he will go off-hook whereupon line finder 11 will function and connect his line through to selector-connector 12, both line finder 11 and selector 12 being parts of the special switch train. Dial tone will be received after connection of the selector-collector and the caller will then dial "34" the number of the called station. Assuming that station B is idle the connection will be completed in the normal way. However, in the event called station B is busy and caller A receives a busy tone, he then goes on-hook and, if he wishes to establish camp on he immediately reinitiates the call but this time he first dials "7." This brings him to the seventh level on selector-connector 12 from which he is connected through the camp on and ringback circuit (FIG.

2) and the test connector (FIG. 3). The normal number "34" will then be dialed as before; the actual establishment of camp on will be described subsequently in connection with FIGS. 2 and 3.

The calling party may now remain off-hook and when the called party completes the first call and goes on-hook his station will be immediately rung. The calling party may elect to go on-hook after establishing the camp on and, assuming that he remains on-hook, both his station and the called station will be immediately rung as soon as the called subscriber goes on-hook at the termination of the first call. As also described subsequently, in the event the calling party does not go off-hook within a predetermined period in response to the ringback signals, the circuit will automatically restore to normal.

Figure 2:
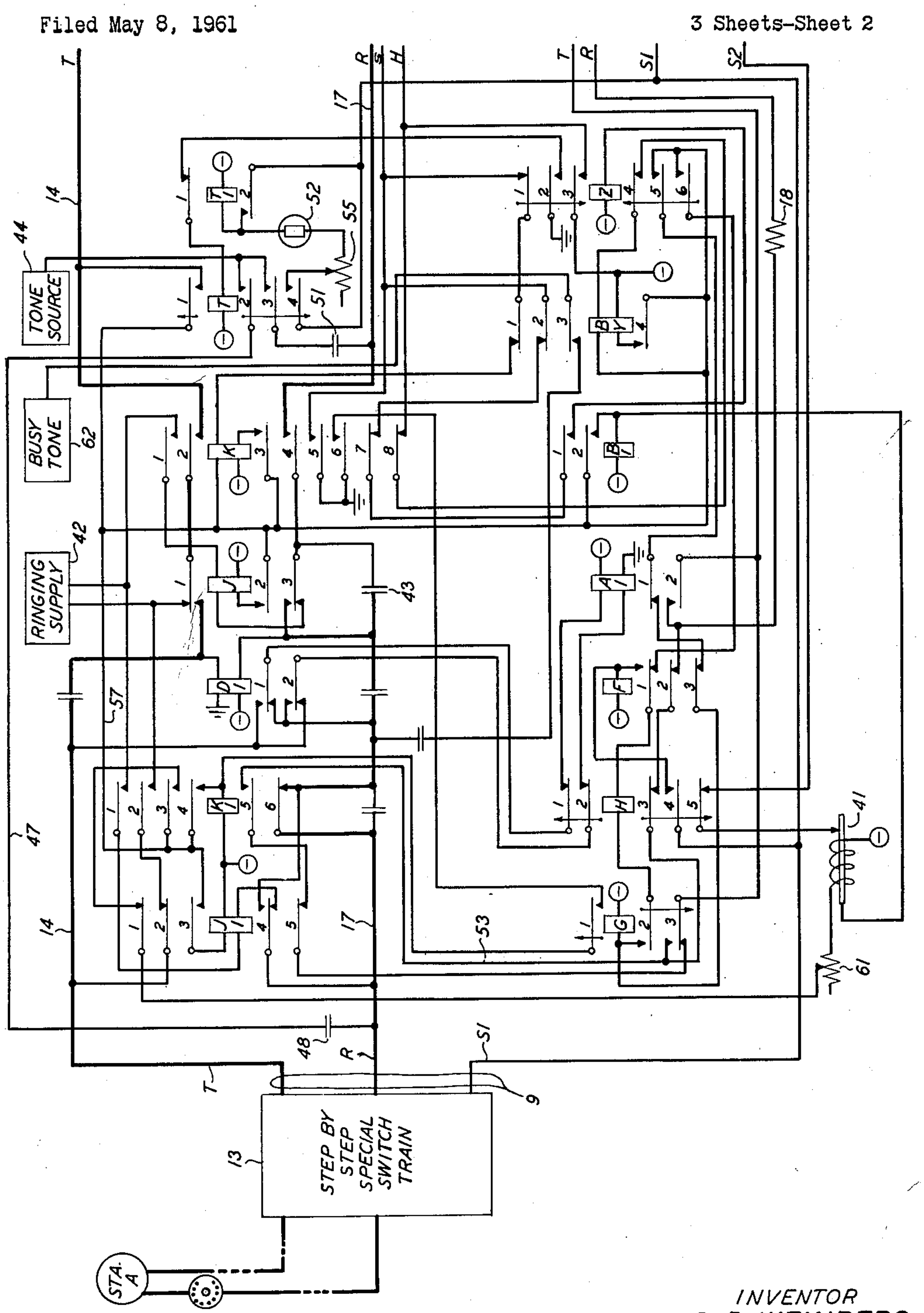
FIG. 2 shows one specific illustrative embodiment of the camp on and ringback circuit.
Figure 3:
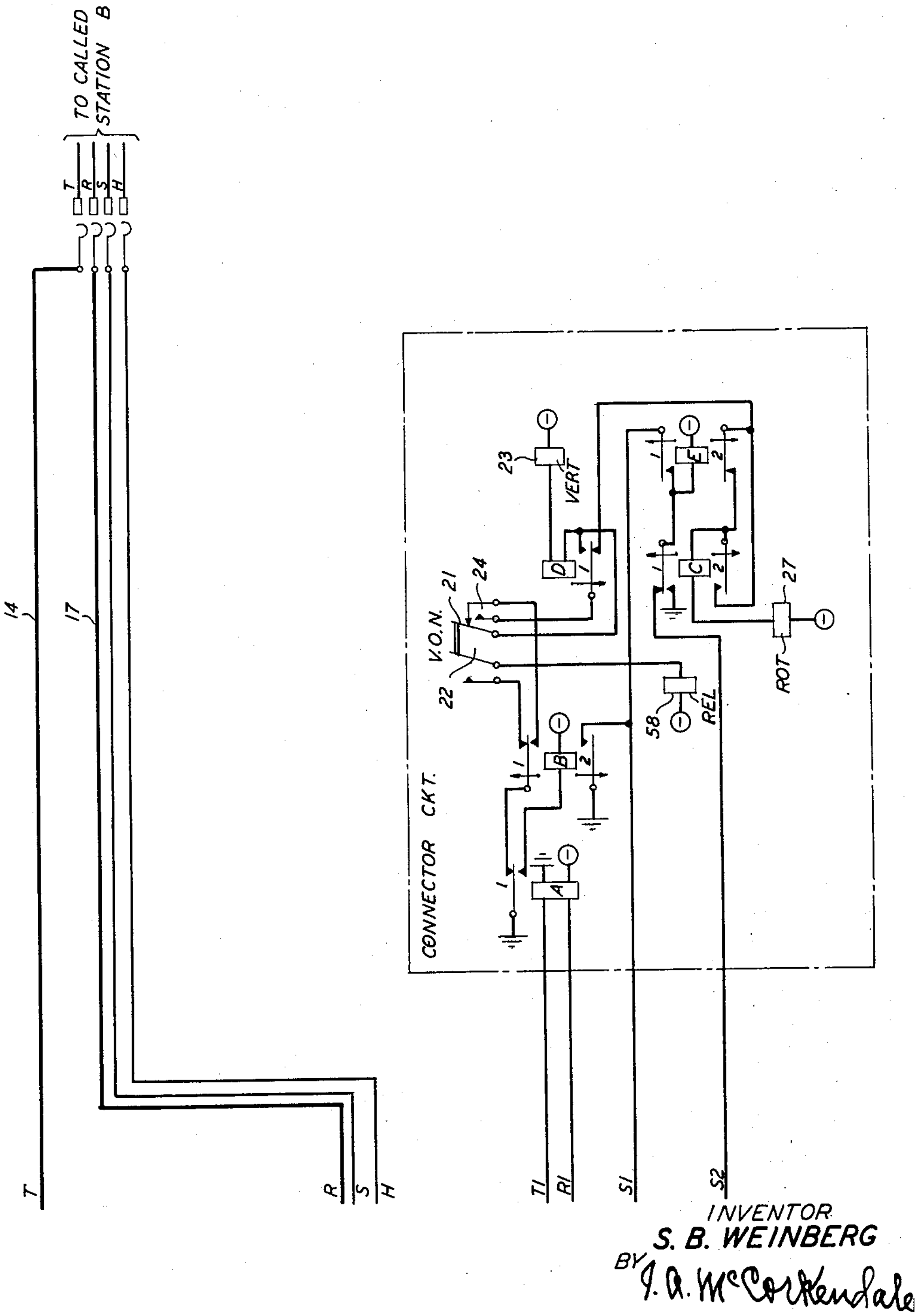
FIG 3 shows a step-by-step connector circuit adapted for use with the camp on and ringback circuit.

Referring now to FIGS. 2 and 3, and assuming that the camp on and ringback circuit has been seized by a selector-connector of the switch train 13, as discussed above in reference to FIG. 1, relay A1 will be operated over a path from battery, upper winding of relay A1, No. 1 break contact of relay H, No. 1 break contact of relay D1, No. 6 break contact of relay K1, ring lead 17, through the closed loop to tip lead 14, No. 2 break contact of relay D1, No. 2 break contact of relay H, lower winding of relay A1 to ground. Relay A1, operated, completes at its No. 2 make contact a path bridging resistor 18 across the windings of relay A (FIG. 3) whereupon relay A operates from battery, lower winding of relay A, resistor 18, No. 2 make contact of relay A1, upper winding of relay A to ground. Relay A, operated, completes at its No. 1 make contact an obvious operating path for relay B which operates and connects ground through its No. 2 make contact back over the S1 lead through the circuit to hold the preceding stages in the normal manner.

Now as the calling party at station "A" dials the number of the called station (Ext. 34) relay A1 will follow the dial pulses as the loop opens and closes; the "pulsing" operation of relay A1 will open and close the resistance bridge across relay A, and relay A will accordingly repeat the pulses. When relay A is released for the first pulse of the dialed digit, a path is completed from ground, No. 1 break contact of relay A, No. 1 make contact of relay B, (since relay B is slow-to-release, it holds operated over the train of pulses), break contact 21 of vertical off-normal switch 22, windings of relay D and vertical magnet 23 in series to battery, relay D and vertical magnet 23 operating in series over this path.

Vertical magnet 23 steps the connector up one level and also operates vertical off-normal switch 22 thereby transferring the previously traced operating path of vertical magnet 23 from break contact 21 of the vertical off-normal switch to make contact 24 thereof and make contact No. 1 of relay D which is slow-to-release and therefore remains operated over the train of pulses. Vertical magnet 23 steps one level with each pulse of the dialed digit; relay D releases at the end of the digit.

When the next digit is dialed the pulsing of the A relay will operate rotary magnet 27 over a path from ground, No. 1 break contact of relay A, No. 1 make contact of slow-to-release B relay, make contact 24 of vertical off-normal switch 22, No. 1 break contact of relay D, No. 2 break contact of relay E, through windings of relay C and rotary magnet 27 in series, to battery; relay C operates and completes a path for operation of relay E traced from ground, No. 1 make contact of relay C, winding of relay E to battery. When relay C operates, its operating path is then transferred to its No. 2 make contact, and when relay E operates, it locks through its No. 1 make contact to ground on the No. 2 make contact of relay B. The C relay, being slow-to-release, holds over the train of pulses; at the end of pulsing the connector wipers are on the line terminals of the called station B (Ext. 34).

Upon completion of pulsing, relay C releases and ground from No. 2 make contact of relay B (slow-to-release) is connected through No. 1 make contact of relay E and No. 1 break contact of relay C over lead S2 to the camp on and ringback circuit. This ground operates relay B1 over a path through No. 5 break contact of relay H, closed contact and armature of thermal relay 41, winding of relay B1 to battery, and also provides starting ground for the below described operations of the camp on and ringback circuits.

1. *Called Line Is Idle*

When the line of called station B is idle, battery will be found on the S line terminal in accordance with normal operation of the line circuit, and this battery will be connected through the connector switch wipers to the S lead, thence through the No. 1 break contacts of relays Z and BY, upper winding of relay K, No. 2 make contact of relay B1 to ground from the S2 lead; relay K operates over this path and locks to the same ground over a path from battery, lower winding and No. 3 make contact of relay K, No. 2 make contact of relay B1 to the ground on the S2 lead. Upon operation of relay K, ground is connected through its No. 5 make contact over the S lead to the called station line whereby to operate the cut-off relay therein and to "busy" the line terminals to other connectors. Also, relay K, operated, partially closes at its respective No. 2 and No. 4 make contacts the tip lead 14 and the ring lead 17 toward the calling party. Ringing current from ringing supply 42 is applied to ring lead 17 through No. 1 make contact of relay K, upper winding of relay J, No. 3 break contact of relay J, No. 4 make contact of relay K, over the ring lead 17 to the called station to ring that extension. Ringing induction tone is returned to the calling party through capacitor 43.

Now when the called subscriber goes off-hook in response to the ringing and closes the substation loop at station B, relay J will operate on the current from ringing current source 42 in the upper winding and, upon operating, will lock from battery, lower winding and No. 2 make contact of relay J, No. 2 make contact of relay B1 to the ground on lead S2. Relay J, operated, trips the ringing by removing the ringing current at its No. 1 and No. 3 break contacts and connects at its No. 1 and No. 3 make contacts the tip line 14 and ring line 17 through to the calling party at station A. Talking battery for the called station is now supplied to the called station over the tip and ring leads through the windings of relay D1, and this relay operates to reverse battery and ground to the calling party for purposes of supervision.

2. *Called Line Is Busy*

Assuming now for purposes of further description that at the time the ground was supplied over the S2 lead and after the connector wipers engaged the terminals of the called line (Ext. 34), the called station had been found busy, ground would then be present on the S lead instead of battery as in the previously described "idle" condition. This ground will cause operation of the Z relay over a path from the S lead, No. 2 break contact of relay BY, No. 7 break contact of relay K, No. 1 make contact of relay B1, winding of relay Z to battery. (The Z relay is slow-to-operate and relay BY will operate before operation of relay Z in the event battery is present on lead H due to a previously established camp on; this will be discussed in further detail subsequently.)

Relay Z, operated, completes a path for operation of relay T traced from battery, winding of relay T, break contact No. 1 of relay T1, make contact No. 2 of relay Z to ground. While relay T is operated, a suitable tone from tone source 44 is applied through its No. 2 make contact, lead 47, capacitor 48 and over ring lead 17 to the calling party and through its No. 3 make contact and capacitor 51, over ring lead 17 to the called party. This tone application is an important and valuable feature of the camp on facility of the present invention since, on the one hand, it informs the calling party that camp on has been established, and, on the other hand, it advises the busy called party that another call, presumably of substantial importance, is awaiting his attention. He may then be led to terminate the first call as promptly as feasible in order to permit completion of the camped on call. In order to enhance still further the value of the tone feature, means including relay T1 are contemplated whereby the duration of the tone can be readily varied.

Relay T, operated, completes a path for subsequent operation of relay T1 traced from ground, make contact No. 2 of relay B, S1 lead, make contact No. 4 of relay T, thermistor 52, (a resistor of a type well known in the art having a large negative temperature coefficient) winding of relay T1 to battery; as thermistor 52 heats over this path, its resistance decreases until sufficient current is passed to operate relay T1. Relay T1 upon operating locks through its No. 2 make contact to the ground on the S1 lead and interrupts at its No. 1 break contact the operate path for relay T which releases and removes the tone from the line. The "operate" period of relay T (and the duration of the tone) is directly determined, therefore, by the characteristics of thermistor 52 and can accordingly be readily varied as desired by proper selection of the thermistor. Also, if desired, variable resistor 55 may be provided to vary the heating current applied to the thermistor.

Relay Z, operated, also opens at its No. 1 break contact the operating path of the K relay (through upper winding thereof), opens at its No. 4 break contact the operating path of the BY relay (also through the upper winding thereof) and connects through its No. 3 make contact battery to the H lead and thence to the H line terminal of the called station in order to "busy" the line to other connectors that might attempt to camp on; relays K and BY release. The circuit remains in this condition, camped on to the busy line, until a change in the condition of the line is detected; it is assumed that the calling party has remained off-hook.

When the called line becomes idle and the called party has gone on-hook, ground on the S lead is changed to battery by the normal operations of the line circuit and relay Z which was operated to the S ground will release. With Z relay released the operating path for relay K is reestablished and that relay operates from battery on the S lead, No. 1 break contacts of relays Z and BY, upper winding of relay K, No. 2 make contact of relay B1 to the ground supplied over lead S2. The subsequent operations of the circuit, including ringing the now idle called station are the same as described above for the idle-called-line condition.

3. *Calling Party Goes On-Hook After Camp On*

Assuming now that the calling party, after he received the "camp on" tone, went on-hook and remained in that condition, relay A1 releases upon the station loop being opened, thereby releasing relay A and opening the operating path of relay B. As pointed out above relay B is slow-to-release, and before it actually releases, relay G operates from battery, winding of relay G, No. 3 break contact of relay F, No. 1 break contact of relay A1, No. 5 make contact of relay Z, No. 2 make contact of relay B1 to the ground supplied over lead S2. Relay G, operated, closes a path for reconnection of the resistance bridge across the windings of relay A which reoperates over this path traced from battery, lower winding of relay A, resistor 18, No. 2 break contact of relay F, No. 3 break contact of relay H, No. 3 make contact of relay G, upper winding of relay A to ground. Relay G, operated, also connects the grounded side of its winding through its No. 2 make contact to one side of the winding of relay H, the other side of which is connected through No. 1 break contact of relay F, No. 6 make contact of relay Z, No. 2 make contact of relay B1 to the ground supplied over lead S2. Relay H does not operate at this time, however, since its winding is shunted to ground over a portion of the operating path of relay G. The circuit remains in this condition until the called line becomes idle, it being assumed that the calling party does not go off-hook in the meantime for initiation of another call.

Now when the called line becomes idle and the called party goes on-hook, ground on the S lead is replaced by battery as above described, and relay Z releases. When relay Z releases, relay K operates from the ground now on the S lead, break contacts No. 1 of relay Z and No. 1 of relay BY, upper winding of relay K, make contact No. 2 of relay B1 to the ground supplied over the S2 lead. Release of relay Z opens at its No. 5 make contact the operate path of relay G which starts to release. Relay G is slow-to-release and there is sufficient time lag in its movement to full release position to permit ground on the No. 6 make contact of relay K to pass through its No. 1 make contact and through the winding of relay K1 to battery whereby to operate relay K1; relay K1 operates and before its operating path is interrupted by full release of relay G, it locks through its No. 4 make contact, lead 57 and No. 2 make contact of relay B1 to the ground supplied over the S2 lead.

When relay G has released the holding path for relay A is transferred from No. 3 make contact to No. 3 break contact of relay G and is now traced from battery, lower winding of relay A, resistor 18, No. 2 break contact of relay F, No. 3 break contact of relay H, lead 53, No. 5 make contact of relay K1, No. 5 break contact of relay J1, No. 3 break contact of relay G, upper winding of relay A to ground.

Relay Z, released, reestablishes the operating path for relay K which operates from battery on the S lead, No. 1 break contacts of relay Z and BY, upper winding of relay K, No. 2 make contact of relay B1 to the ground supplied over the S2 lead; relay K, operated, supplies ringing current over ring lead 17 to the called station as described above in connection with the idle condition of the called line.

When relay K1 operated as above described it connected ringing current from source 42 through its No. 1 make contact and through lower winding and No. 4 break contact of relay J1 and over ring lead 17 to calling station A. Relay K1, operated, also opens at its No. 6 break contact ring lead 17 so that the ringing circuit will not be shunted by paths through the windings of relay A1. Ringing induction is supplied toward the called station by capacitor 43 so that should the called party answer first he will be appraised of that fact that the calling party is being rung.

When the calling subscriber at station A responds to the ringback by going off-hook and closing the substation loop, relay J1 will operate on the ringing current and will lock from battery, upper winding and No. 3 make contact of relay J1, lead 57, make contact No. 2 of relay B1 to the ground supplied over the S2 lead. Relay J1, operated, trips the ringing by removing the ringing current at No. 4 break contact and restores at its No. 4 make contact the connection of ring lead 17 to relay A1. Relay A1 operates through the closed loop at calling station A and completes through its No. 2 make contact a holding path for relay A. When both the called and calling parties have responded to the ringback by going off-hook at their respective stations a talking connection is established in the normal manner.

4. *Calling Party Fails To Respond to Ringback*

It is possible, of course, that the calling party, after having established the camp on and before receiving ringback, may leave his office and in such event it is, of course, desirable that the ringback, if unanswered within a reasonable time, be automatically cut off and the circuit restored to normal. This is provided for in the novel arrangement contemplated by the present invention.

When the K1 relay operates as above described, but before response by the calling party with resultant operation of relay J1, a path is completed from battery, winding of thermal relay 41, break contact No. 1 of relay J1, No. 3 make contact of relay K1, lead 57, No. 2 make contact of relay B1, break contact of relay 41, break contact No. 5 of relay H to ground supplied over the S2 lead. Relay 41 is selected to have the characteristics necessary for the particular "time-out" period desired; in the present instance this will be assumed to be 60 seconds. If the calling party responds to the rinkback before the expiration of the time-out period relay J1 will operate as above described and the heating path of relay 41 will be interrupted at No. 1 break contact of relay J1. However, if the calling subscriber has not responded at the expiration of the time-out period, here assumed to be 60 seconds, thermal relay 41 will operate and open at its now opened contact the path over which the holding ground was previously supplied to the circuit over lead S2. With removal of the holding ground the operated relays release, release magnet 58 is energized upon release of relay A and the circuit restores to normal.

It will be apparent that the extent of the time-out period can be readily varied either by selecting thermal relays, corresponding to relay 41, with proper characteristics or by proper readjustament of the mechanical portions of relay 41 itself. Further, if desired, variable resistor 61 may be provided in the heater path to vary the operating period of the relay.

5. *Calling Party Goes Off-Hook Before Ringback*

It may, of course, transpire that the calling party, after having established camp on and gone on-hook, may find it desirable to initiate another call before ringback has been received, and it is of course desirable in such event that the camp on be automatically removed to permit the new call. In accordance with the novel arrangement contemplated by the invention this is readily accomplished.

The calling party, wishing to initiate another call without awaiting ringback, goes off-hook. It will be recalled from the above description that at this point relays G, Z and A are all operated. When the loop at the calling station is closed, relay A1 operates and removes at its No. 1 break contact ground from the winding of slow-to-release relay G. This also removes the previously described shunting ground on the winding of relay H and relay H now operates in series with relay G (not yet released) over a path from battery, winding and No. 2 make contact of relay G, winding of relay H, No. 1 break contact of relay F, No. 6 make contact of relay Z, No. 2 make contact of relay B1 to the ground supplied over lead S2; relay G and relay H hold operated in series over this path.

Relay H, operated, opens at its No. 1 and No. 2 break contacts the connection of the tip lead 14 and the ring lead 17 to the windings of relay A1 thereby releasing relay A1, opens at its No. 3 break contact a portion of a holding path across the A relay windings, removes at its No. 5 break contact the S2 holding ground from the circuit, and completes at its No. 4 make contact an operating path for relay F to the ground on the S1 lead.

Relay F, operated, removes at its No. 1 break contact the previous holding ground for relays G and H, but holds these relays (both slow-to-release) operated by substituting a connection to ground on the S1 lead through No. 1 make contact of relay F and No. 4 make contact of relay H.

Relay A releases, following the release of relay A1 and the interruption of the holding bridge at No. 2 break contact of relay F, and this is followed by release of relay B. Release magnet 58 operates upon release of relay B and restores the connector to normal.

Relay B, released, removes at its No. 2 make contact ground from the S1 lead, releasing relay F which is followed by release of relays H and G. When relays H and G (both slow-to-release) are fully released the circuit restores to normal and dial tone will be received by the calling subscriber.

6. *Camp On Busy*

If, when the connector wipers stop on the busy called station terminals, another connector is already camped on, battery will be found on the H terminal and lead. (From No. 3 make contact of the operated Z relay of the involved camp on and ringback circuit.) Relay BY will operate from this battery, over a path from No. 8 break contact of relay K, No. 4 break contact of relay Z, winding of relay BY, No. 2 make contact of relay B1 to the ground supplied over the S2 lead, operation of relay BY occurring before relay Z (slow-to-operate) can operate from the ground on the S lead. Relay BY, operated, locks to the S2 lead ground and opens at its No. 1 and No. 2 break contacts, respectively, the operating paths for relay K and relay Z thereby preventing the connection from cutting through. Also, relay BY operated connects at its No. 3 make contact busy tone from source 62 out over ring lead 17 to the calling party as a signal that a camp on connection from another calling station has already been established on the line which he desired to call.

*Normal Release*

When the calling party goes back on-hook after termination of a call, the A1 relay will release and this, in turn, releases relay A. Release of relay A is followed by release of relay B; release of relay B, completes a previously described operate path for release magnet 58 which operates to restore the connector to normal position.

While a specific embodiment of the invention has been selected for detailed disclosure, the invention is not, of course, limited in its application to the embodiment disclosed. The embodiment which has been described should be taken as illustrative rather than restrictive thereof.

What is claimed is:

1. In a telephone system, a private branch exchange, a calling extension and a busy called extension at said private branch exchange, means initiated by said calling extension for camping on the line of said busy called extension, means for transmitting an alerting tone to said busy called extension at the time camp-on to his line is established, said initiating means including a relay, a bridging resistor, a first operating path and a second operating path for said relay, both of said paths including said resistor, means effective upon said calling extension first going off hook for completing said first path whereby to operate said relay, means effective upon said calling extension going on hook for interrupting said first path and completing said second path whereby to hold said relay operated, and means effective upon the calling party again going off hook for removing the camp-on condition.

2. In a telephone system, a private branch exchange, a calling extension and a busy called extension at said private branch exchange, means initiated by said calling extension for camping on the line of said busy called extension, means for transmitting a tone to both extensions for a predetermined period of time when the camp-on is established, said initiated means including a relay operating when said calling extension first goes off hook, means effective upon said calling extension going on hook for holding said relay operated whereby to maintain the camp-on condition, said last-mentioned means including an operating path for said relay, a bridging resistor included in said operating path, for ringing both said extensions, and means effective upon said calling party going off hook before said extensions are rung for removing the camp-on condition.

3. In a teelephone system, the combination set forth in claim 2 further comprising means for varying the duration of said predetermined period.

4. In a telephone system, the combination set forth in claim 3 further characterized in that said varying means comprises a relay, a thermistor connected in series with the operating winding thereof, and means for varying the heating current applied to said thermistor.

5. In a telephone system, a private branch exchange, a calling extension and a busy called extension at said private branch exchange, means initiated by said calling extension for camping on the line of said busy called extension, said initiating means including a first relay, a bridging resistor, a first operating path and a second operating path for said relay, both of said paths including said resistor, means effective upon said calling extension first going off-hook for completing said first path whereby to operate said relay, means effective upon said calling extension going on hook for interrupting said first path and completing said second path whereby to hold said relay operated, a thermal relay operable after a heating period of predetermined duration, means effective upon said called party going on hook for ringing both said extensions and for applying heating current to said thermal relay, and means effective upon said calling party going off hook in response to said ringing for discontinuing said heating current, operation of said thermal relay being effective to remove the camp-on and restore the circuit to normal.

6. In a telephone system, the combination set forth in claim 5 further comprising means for varying the duration of said heating period.

7. In a telephone system, the combination set forth in claim 5 further comprising means for varying the heating current applied to said thermal relay whereby to vary the duration of said heating period.

8. In a telephone system, a private branch exchange, a calling extension and a busy called extension at said private branch exchange, means initiated by said calling extension for camping on the line of said busy called extension and holding said camp-on condition, a bridging resistor, said means including a relay and a first circuit for holding said relay in operated position while said calling extension is off hook, said first circuit including said bridging resistor, separate means effective when said calling extension goes on hook for holding said relay in operated position, said separate means including a second circuit, said second circuit also including said bridging resistor, and additional means effective when said calling extension again goes off hook for rendering said separate means ineffective and releasing said relay, release of said relay being effective to remove said camp-on condition.

9. In a telephone system the combination set forth in claim 8 further characterized in that said separate means comprises a second relay and means for operating it when said calling party goes on hook whereby to complete said second circuit and said additional means comprises a third relay and means for operating it when said calling party again goes off hook.

10. In a private branch exchange telephone system, a calling extension and a busy called extension, means initiated by said calling extension for camping on the line of said busy called extension and holding said camp-on condition, said means including a relay, means effective upon said calling extension first going off hook for operating said relay, said last-mentioned means including a bridging resistor and a first operating path for said relay including said bridging resistor, separate means effective upon said calling extension going on hook for holding said relay operated, said separate means including a second operating path for said relay also including said bridging resistor, means effective upon said called party going on hook for ringing both said extensions, means effective upon the failure of said calling extension to respond to said ringnig by going off hook within a predetermined period for removing the camp-on and restoring the circuit to normal, and means effective upon said calling party going off hook again while said called extension is still busy for removing said camp-on and restoring the circuit to normal.

References Cited in the file of this patent

UNITED STATES PATENTS

| | | |
|---|---|---|
| 2,497,782 | Lomax | Feb. 14, 1950 |
| 2,861,131 | Villman | Nov. 18, 1958 |